United States Patent [19]
Hodgson

[11] 3,813,988
[45] June 4, 1974

[54] GEAR HOBBING MACHINE

[75] Inventor: Brian Hodgson, Rowlands Gill, England

[73] Assignee: Machine Tool Divisional Services Limited, Coventry, Warwickshire, England

[22] Filed: Sept. 25, 1972

[21] Appl. No.: 291,595

[30] Foreign Application Priority Data
Sept. 27, 1971 Great Britain.................... 44932/71

[52] U.S. Cl. .......................................... 90/2, 90/4
[51] Int. Cl. .......................... B23f 3/00, B23f 5/22
[58] Field of Search ............................ 90/2, 4, 6, 3

[56] References Cited
UNITED STATES PATENTS
3,469,495  9/1969  Kelly........................................ 90/4

Primary Examiner—Gil Weidenfeld

[57] ABSTRACT

A gear hobbing machine comprising a hob head, a table for supporting a workpiece to be hobbed, a template mounted on one of said parts and arranged to traverse past a stylus during relative axial movement of the hob and workpiece to perform first and second cuts, means controlled by the stylus for effecting relative radial movement between the hob and the workpiece and thereby perform a crowning or taper hobbing operation on the workpiece, a push rod mounted on the part carrying the stylus and arranged to move the stylus into contact with the template during radial advance of said part towards the other part and means for automatically reducing the effective length of the push rod after the hob has made a first cut and prior to commencement of a second cut by the hob.

2 Claims, 4 Drawing Figures 3,813,988

GEAR HOBBING MACHINE

This invention relates to a gear hobbing machine of the kind, described for example in British Patents Nos. 1,069,138 and 1,096,562, comprising a hob head, a table for supporting a workpiece to be hobbed, a template mounted on one of said parts, a cooperating stylus mounted on the other part and arranged to traverse the template during relative axial movement of the hob and the workpiece and means controlled by the stylus for effecting relative radial movement between the hob and the workpiece and thereby perform a crowning or taper hobbing operation on the workpiece.

Thus the template may be mounted on the hob head and the stylus on the table, the stylus coacting with an electromechanical transducer to control a fluid pressure operated cylinder and piston assembly for moving the table radially towards or away from the hob head as the stylus follows the contour of the template. To perform crowning the surface of the template presented to the stylus may be a segment of a right circular cylinder, the template being angularly adjustable with respect to the hob head about an axis parallel to the axis of the stylus.

When a gear is to be produced by two cuts, namely a roughing cut and a finishing cut, it is necessary prior to the second cut to change the point during traverse of the table towards the hob head at which the stylus contacts the template. This can be achieved by changing the position of the template with respect to the hob head but complicated template moving and resetting actuators are necessary to achieve this automatically.

The invention provides a gear hobbing machine of the above type which includes a push rod mounted on the part carrying the stylus and arranged to move the stylus into contact with the template during radial advance of said part towards the other part and means for automatically reducing the effective length of the push rod after the hob has made a first cut and prior to commencement of a second cut by the hob.

One embodiment of gear hobbing machine according to the invention will now be described in more detail, by way of example, with reference to the accompanying drawings, in which.

Figure 1:
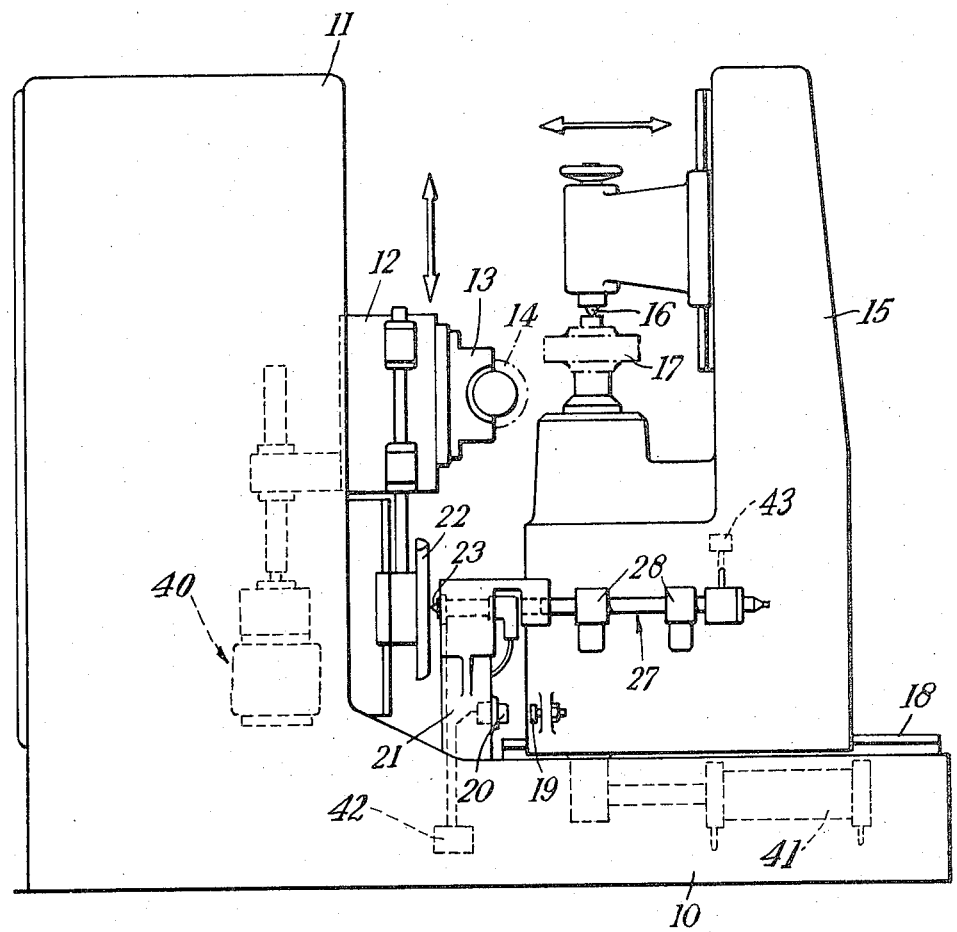
FIG. 1 is a side elevation of the machine.

The machine shown in FIG. 1 is of the general construction described in British Pat. No. 1,096,562 and includes a bed 10 carrying a column 11, on which is mounted a vertical slide 12 carrying a hob head 13 in which is rotatably mounted a hob 14. A table 15, carrying a tail stock 16 for supporting a gear blank 17 to be hobbed, is mounted on a horizontal slideway 18 on the base 10. In operation, the rotating hob 14 is traversed past the rotating gear blank 17 by vertical movement of the slide 12 in conventional fashion, by an actuator show symbolically at 40, the table 15 is urged to the left (as seen in FIG. 1) by a pneumatic or hydraulic actuator (shown symbolically at 41) in conventional fashion to maintain a stop 19 on the table in contact with a stop 20 carried by a member 21 projecting upwardly from the bed 10.

As in British Pat. No. 1,096,562, provision is made for crowning of the hobbed gear by coaction with a template 22, which travels up and down with the slide 12, of a probe 26 (FIG. 2), constituted by a stylus 23 and as associated transducer 24 (FIG. 2), which adjusts, through a servo mechanism, indicated symbolically at 42, the position of the stop 20 as the stylus 23 follows the contour of the template 22.

Figure 2:
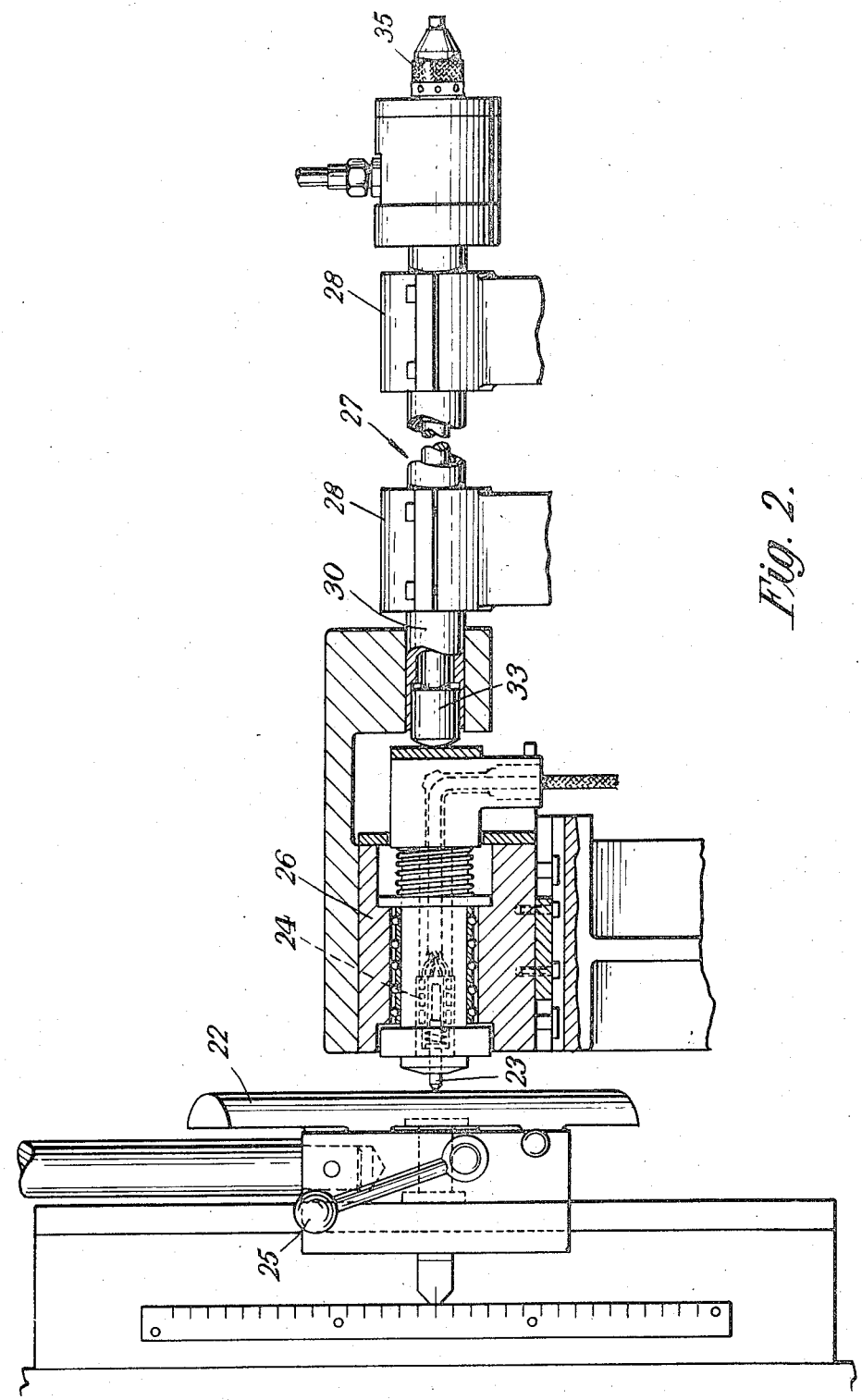
FIG. 2 is a side elevation, partly in section, on a larger scale showing the template and associated probe and transducer assembly and push rod.

As shown in FIG. 2, the template 22 is in the form of a segment of a right circular cylinder and is supported on a rod extending downwardly from the slide 12. The template 22 is angularly adjustable with respect to the hob head 13 about an axis parallel to the axis of the stylus 23 to determine the extent of crowning and can be locked in adjusted position by a handle 25. For taper hobbing an appropriate differently shaped template would be used.

During advance of the table 15 towards the hob head 13 at the start of the crowning cycle, a push rod 27, supported in brackets 28 on the table, contacts the rear end of the probe 26 and pushes it, against the action of a spring 29 within the push rod, into contact with the template 22.

During the vertical movement of the hob 13 the template 22 is traversed past the probe 26 causing the transducer 24 to adjust through said servo control the position of the stop 20 determining the limit of infeed of the table 15. The radial motion of the table 15 to form the crowned or tapered gear tooth is therefore determined by the contour of the template 22.

When the template 22 is positioned with its longitudinal axis vertical, the stylus 23 will travel in a linear path along the surface of the template producing no change in pressure on the transducer 24 and therefore no change in position of the stop 20. When, however, the template 22 is positioned with its longitudinal axis inclined to the vertical, the stylus 23 as it traverses the template 22 will be forced progressively rearwardly against the transducer 24 until it reaches the highest point of the template and will thereafter be free to move progressively away from the transducer. The stop 20 will therefore be adjusted so as to provide first a gradual decrease in the depth of cut and thereafter a gradual increase in the depth of cut to produce crowned teeth on the gear blank. If a template is substituted which causes adjustment of the stop 20 to produce a progressive increase or decrease in depth of cut, tapered teeth will be cut on the gear blank.

The machine includes means whereby, when a gear is to be produced in two cuts, the tooth depth is changed automatically by retracting the push rod 27 after performance of the first cut.

Figure 3:
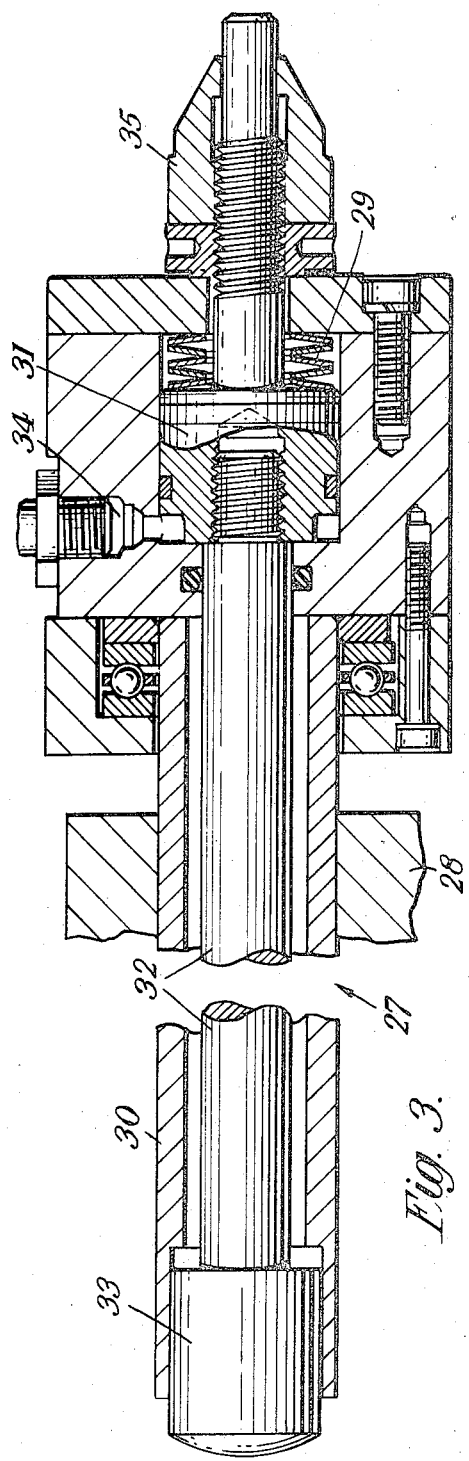
FIG. 3 is a sectional view of the push rod on a still larger scale showing it in the position it assumes for the first cut.
Figure 4:
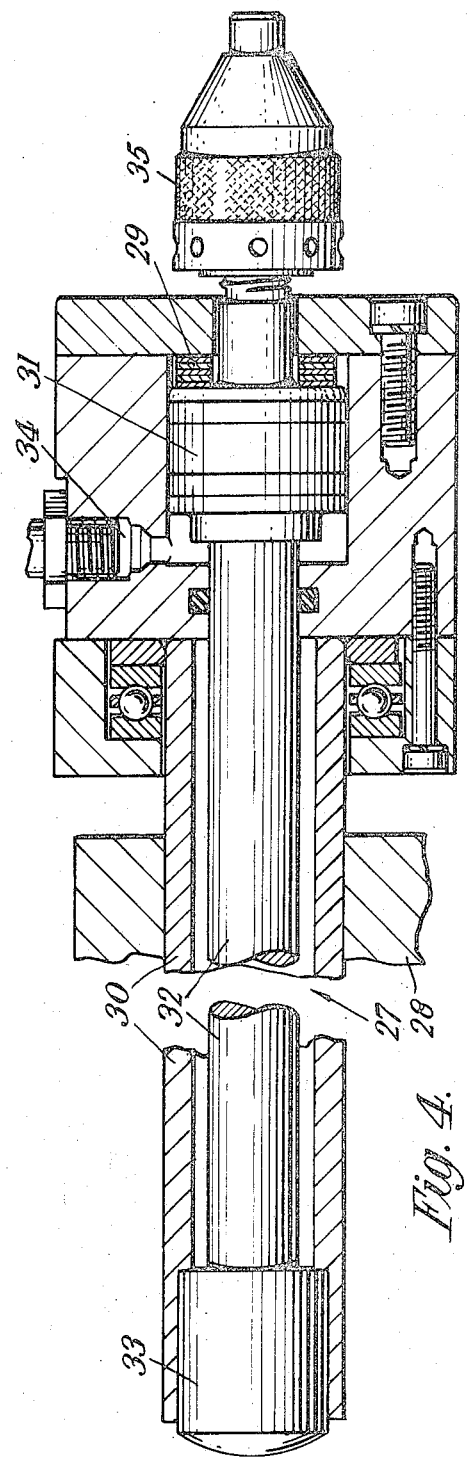
FIG. 4 is a similar view showing the position assumed by the push rod for the second cut.

To this end, the push rod 27 is formed, as shown most clearly in FIGS. 3 and 4, as a hollow cylinder 30 containing a piston 31 attached by a rod 32 to a button 33 projecting from the front end of the push rod and serving to operate the probe 26. Normally, the piston 31 is urged by the spring 29, which is interposed between its rear end and the rear end of the cylinder 30, so as to project the button 33 to the maximum extent, as shown in FIG. 3. After completion of the first cut hydraulic or pneumatic pressure is automatically applied, through an inlet 34, to the front face of the piston 31 to retract the button 33 to the position required for the second and final cut as shown in FIG. 4. Such pressure may be applied under control of an assembly, shown symbolically at 43 in FIG. 1 and including a solenoid valve, in turn controlled by a limit switch operated by the hob.

When the effective length of the push rod 27 is reduced as described by admission of pressure to the inlet 34, the table 15 will advance further toward the hob head 13 before the stylus 23 contacts the template 22 so that a deeper cut will be produced than that produced when the button 33 is projected by the spring 29 as in FIG. 3.

The rear end of the piston rod 32 projects from the cylinder 30 and is screw threaded, carrying a nut 35 in the form of a dial which can be turned to adjust the compression of the spring 29 and therefore the difference between the two depths of cut.

I claim:

1. A gear hobbing machine comprising a hob head, a hob carried by the hob head, a table for supporting a workpiece to be hobbed, a template mounted on the hob head, a stylus, means for effecting relative axial movement of the hob and workpiece to perform first and second cuts and to traverse said template past said stylus during said cuts, a push rod mounted on the table in alignment with the stylus and initially out of contact with the stylus, means for advancing the table to approach the workpiece to the hob head and thereby to cause said push rod to engage the stylus and move it into contact with the template, means controlled by the stylus for effecting relative radial movement between the hob and the workpiece and thereby modify the tooth form cut on the workpiece in accordance with variations in contour of the template, and means for automatically reducing the effective length of the push rod after the hob has made a first cut and prior to commencement of a second cut by the hob.

2. A machine as claimed in claim 1, wherein the rod is formed as a hollow cylinder, containing a piston carrying a button projecting from the end of the rod and effective to move the stylus into contact with the template and a spring urging the piston in the direction to project the button from the rod and wherein said length-reducing means is operative to apply fluid pressure to the piston to retract the button against the action of the spring.

* * * * *